United States Patent [19]

Saleeb et al.

[11] Patent Number: 4,547,378

[45] Date of Patent: Oct. 15, 1985

[54] ROASTED COFFEE EXTRACT DECAFFEINATION METHOD

[75] Inventors: Fouad Z. Saleeb; Bary L. Zeller, both of Pleasantville, N.Y.

[73] Assignee: General Foods Corporation, White Plains, N.Y.

[21] Appl. No.: 566,605

[22] Filed: Dec. 29, 1983

[51] Int. Cl.$^4$ .............................................. A23F 5/22
[52] U.S. Cl. .................................. 426/271; 426/422; 426/427
[58] Field of Search ...................... 426/271, 422, 427; 544/274, 275

[56] References Cited

PUBLICATIONS

Sivetz, Coffee Processing Technology, vol. 2, 1963, Avi: Westport, Conn., pp. 207-214.

*Primary Examiner*—Joseph M. Golian
*Attorney, Agent, or Firm*—Thomas A. Marcoux; Joseph H. Harcarik; Daniel J. Donovan

[57] ABSTRACT

A roasted coffee extract decaffeination method providing a soluble coffee of improved flavor is disclosed. A roasted coffee extract is contacted with a caffeine solvent so that caffeine and a lesser amount of non-caffeine solubles is transferred to the solvent. The two liquids are separated and the caffeine solvent is typically concentrated. The concentrated solvent is then contacted with an aqueous caffeic acid suspension so that caffeic acid/caffeine complex crystals grow in the water phase. The complex crystals are filtered and the then at least partially decaffeinated caffeine solvent is separated from the water phase. Contact of the caffeine solvent and an aqueous caffeic acid suspension may be repeated to achieve further decaffeination. Then, the solvent, which contains substantially only non-caffeine solubles, is added to the substantially decaffeinated roasted coffee extract. The caffeine solvent is then stripped from the roasted coffee extract, which is subsequently dried.

11 Claims, No Drawings

ROASTED COFFEE EXTRACT DECAFFEINATION METHOD

TECHNICAL FIELD

The present invention relates to a roasted coffee extract decaffeination method providing a soluble coffee of improved flavor. A roasted coffee extract is contacted with a caffeine solvent. The separated caffeine-containing solvent is contacted with an aqueous suspension of caffeic acid so that caffeic acid/caffeine complex crystals grow in the water phase. The then decaffeinated caffeine solvent containing non-caffeine solubles is separated and added to the decaffeinated roasted coffee extract. Residual solvent is stripped therefrom and the extract is dried.

BACKGROUND ART

One of the more widely practiced decaffeination methods is the process disclosed by Berry et al. in U.S. Pat. No. 2,309,092, the so-called water decaffeination technique. Green coffee beans are first moistened and then extracted with a caffeine-deficient green coffee extract in a multi-stage countercurrent extraction battery. While progressing through the extraction battery, the green coffee extract becomes increasingly rich in caffeine and contacts decreasingly decaffeinated beans. Periodically, the stage containing the most highly decaffeinated coffee is isolated from the battery and a stage containing fresh green beans is placed on stream. Caffeine-laden coffee extract is withdrawn from the last stage of the extraction battery, processed so as to remove the caffeine therefrom and returned to the system as caffeine-deficient green coffee extract. The caffeine is removed from the caffeine-laden extract by contact with an organic solvent, most preferably a halogenated hydrocarbon solvent, such as trichloroethylene or methylene chloride. The water decaffeination technique, although it currently has wide application in the industry, is directed only to the decaffeination of green coffee beans and is not suited to the more efficient decaffeination of roasted coffee extracts.

While techniques are known for decaffeinating roasted coffee extracts, the methods are not without certain drawbacks. For example, Belgian Patent Disclosure No. 865,488 of Bolt et al. describes a process wherein the coffee extract is first decaffeinated with a solvent; the solvent is then contacted with water to transfer the caffeine and unavoidably, some non-caffeine solubles; the decaffeinated solvent is returned to the coffee extract and stripped therefrom; and the caffeine is crystallized from the water phase, which is then discarded. The water phase inevitably contains some non-caffeine solubles which would contribute important body notes to the soluble coffee but are instead discarded. A similar though supposedly improved method is disclosed in U.S. Pat. No. 4,409,253 to Morrison et al. The improvement consists of recyclying the water phase from which the caffeine has been crystallized back to the original caffeine-containing extract. The water phase apparently cannot be combined with the decaffeinated extract because the crystallization leaves substantial caffeine in the water. Hence, the inefficient recycle of the water phase, with the accompanying increase in the amount of caffeine to be removed, is needed.

A complexation approach to the decaffeination of roasted coffee extracts is also known. Caffeic acid is suspended in the roasted coffee extract or the caffeic acid may be dissolved in water and the solution added to the extract. An insoluble, colloidal caffeic acid/caffeine complex forms almost instantaneously, but it is virtually impossible to separate the colloidal complex from the coffee extract. Larger crystals of the complex which are more easily separable will grow on standing but the growth is quite slow, taking upwards of two weeks. Manipulation of the extract pH or temperature promotes more rapid crystal growth but the process is not as fast as is commercially desirable. The chief advantage of the complexation approach is that essentially only the caffeine is removed and virtually all of the non-caffeine coffee solubles initially present remain in the decaffeinated roasted coffee extract.

It is an object of the present invention to provide a roasted coffee extract decaffeination method which produces a soluble coffee of improved flavor.

A further object of the invention is to provide a coffee extract decaffeination method using a complexation approach which is faster than complexing caffeic acid and caffeine directly in the roasted coffee extract.

DISCLOSURE OF THE INVENTION

It has now been found that the objects of the invention are met by a roasted coffee extract decaffeination method which involves first contacting the extract and a caffeine solvent so that caffeine and a lesser proportion of non-caffeine solubles are transferred to the solvent. After separation the then caffeine-containing solvent is concentrated and contacted with an aqueous suspension of caffeic acid so that caffeic acid/caffeine complex crystals form in the water phase. The complex crystals are filtered out and the solvent and water phases are separated. The caffeine solvent may be further decaffeinated by a second contact with an aqueous caffeic acid suspension. The decaffeinated caffeine solvent containing some non-caffeine solubles is ultimately added to the decaffeinated coffee extract and the residual solvent is stripped therefrom. The water phase may also be added to the decaffeinated coffee extract which is then dried into a soluble coffee of improved flavor.

Roasted coffee extracts are decaffeinated by the method of the present invention. Suitable roasted coffee extracts include extracts derived from commercial coffee extraction systems such as those wherein roasted and ground coffee is extracted with water in a multi-stage countercurrent extraction battery. Water at a temperature in excess of about 175° C. is typically fed to the stage containing the most spent coffee so as to hydrolyze the same. As the water progresses through the extraction battery, it becomes increasingly rich in coffee solids, so as to form the roasted coffee extract, while contacting increasingly fresher (less extracted) coffee. The freshest coffee is contacted with the extract in the first stage and the roasted coffee extract is withdrawn therefrom. Periodically, after a previously determined cycle time, the stage containing the most extracted coffee is isolated, a new stage containing fresh roasted and ground coffee is added to the battery and the flow is adjusted to conform to the above description. The stage of fresh coffee may be contacted with steam prior to being placed on stream so as to recover some of the more volatile flavor and aroma compounds. The roasted coffee extract so produced, which in any event contains much of the flavor and aroma of the starting roasted and ground coffee, typically contains between about 10% and 50% by weight total coffee solids and up to about 5% by weight caffeine.

Inasmuch as the roasted coffee extract does in most cases contain much of the flavor and aroma of the roasted and ground coffee, it may be preferable to strip the roasted coffee extract before the contact with the caffeine solvent. Conventional stripping techniques as are known in the art are particularly suitable. The roasted coffee extract may be stripped with steam and the steam condensed as a flavor and aroma condensate for subsequent addition to the decaffeinated coffee extract. Alternatively, the roasted coffee extract can be vacuum evaporated and the evaporate condensed as the flavor and aroma condensate. While such flavor and aroma recovery techniques are useful for the recovery of the volatile flavor and aroma compounds, said techniques are not useful for recovering the nonvolatile body notes which contribute to the overall desirable flavor of the roasted coffee extracts. Some of these body notes do tend to be transferred to the caffeine solvents and are lost in those prior art processes in which no provision is made for their recovery. The soluble coffees produced by such prior art processes are typically characterized as thin and lacking in body.

Whether or not the roasted coffee extract is first stripped of the volatile flavor and aroma compounds, the extract is contacted with a caffeine solvent. Suitable caffeine solvents are those having relatively low miscibility with water, moderate to high solubilities for caffeine and relatively lower solubilities for caffeic acid. Preferred caffeine solvents are also relatively specific for caffeine. That is, the solubility of caffeine in the solvent is appreciably higher than the solubility of non-caffeine solubles. Specific useful caffeine solvents include the halogenated hydrocarbon solvents such as trichloroethylene. Methylene chloride is a particularly preferred caffeine solvent as it is generally water-immiscible, has a fairly good solubility for caffeine and is relatively specific. Methylene chloride is approved for use in decaffeinating coffee and has a long history of such use in the art. Moreover, methylene chloride is relatively inexpensive and readily available.

Contact of the roasted coffee extract and caffeine solvent may be carried out by any method and in any apparatus providing good liquid-liquid contact. For example, the two liquids can be contacted in an agitated batch tank and subsequently separated. Alternatively, a continuous operation may be used. A rotating disc contactor column is one suitable example. A reciprocating plate column, such as a Karr column, is another example. In either such column, the denser of the two liquids enters the top of the column, passes therethrough and is removed at the bottom of the column. The less dense liquid is fed to the bottom of the column, rises therethrough and is removed at the top of the column. The liquid from which something is to be extracted, i.e. the roasted coffee extract, is typically maintained as the dispersed phase in the continuous extracting phase. A distinct separation step is not necessary as the continuous operations provide for the separation after contact of the two liquids. It may be desirable to treat the exiting streams, such as by centrifuging, in order to remove entrained caffeine solvent from the extract and entrained extract from the caffeine solvent.

One of the more important parameters of the contact of the roasted coffee extract and caffeine solvent is the weight ratio of solvent to extract. The most preferred ratio in a given instance depends on the desired degree of decaffeination as well as the concentration of the roasted coffee extract. It has been found though that a range for the weight ratio between 3:1 and 10:1 caffeine solvent to roasted coffee extract is sufficient for a roasted coffee extract having between 10% and 50% by weight coffee solids and up to 5% by weight caffeine. A weight ratio from the above range provides a degree of decaffeination of from less than 50% to better than 97% of the caffeine initially present for a roasted coffee extract within the specified concentration range. The temperature of the contact is not especially important and does not affect the preferred weight ratio of solvent to extract. It is preferable though to maintain a temperature below the boiling points of the two liquids.

After contact with and separation from the roasted coffee extract, the caffeine solvent contains anywhere from about 0.1% to 1.0% by weight caffeine and a lesser proportion of non-caffeine solubles. It is, of course, an object as the invention to remove the caffeine from the caffeine solvent by complexation with caffeic acid. In order to do so efficiently, it has been found that the initial concentration of caffeine in the solvent must be above a certain level, depending on the desired degree of decaffeination. For example, in the case of methylene chloride, it has been discovered that an initial caffeine concentration in the solvent of about 2% by weight is needed to achieve a 75% by weight degree of decaffeination. An initial caffeine concentration of at least about 4% by weight has been found to be necessary to achieve a 90% by weight degree of decaffeination of the caffeine solvent. Increasing the concentration much above 4% by weight does not provide a significantly higher degree of decaffeination, with an initial caffeine concentration of about 6% by weight giving only about a 93% by weight degree of decaffeination. The concentration step of the caffeine-containing caffeine solvent may be by the techniques known in the art such as vacuum evaporation, thin film evaporation, and like methods.

Once the caffeine-containing caffeine solvent has been evaporated to the desired caffeine concentration, the caffeine solvent is contacted with an aqueous suspension of caffeic acid so as to form an insoluble caffeic acid/caffeine complex in the water phase, thus decaffeinating the solvent. Caffeic acid is a yellow crystalline material which begins to soften at about 195° C. It is only sparingly soluble in water at less than about 25° C. and freely soluble in alcohol across a wide range of temperatures. The crystalline caffeic acid/caffeine complex that forms when caffeine and caffeic acid are brought together in the presence of water is also insoluble in water over a wide range of temperatures. Although the existence of the caffeic acid/caffeine complex had been reported in the literature (in, for example, I. Horman and R. Viani, "The Nature and Conformation of the Caffeine-Chlorogenate Complex of Coffee", J. Food Sci. 37 (1972) 925–27), the complex has apparently not been reported to be insoluble in water. In addition, it was surprisingly found that the complex will not typically form in the caffeine solvent alone but will form if there is at least some water present. It has further been found that the complex is insoluble in water and immediately precipitates therefrom. Most conveniently, it is only the caffeic acid/caffeine complex that precipitates, so that essentially no non-caffeine solubles are lost.

The important parameters for the contact of the caffeine solvent and aqueous caffeic acid suspension are the mole ratio of caffeic acid in suspension to caffeine in the solvent and the volume ratio of aqueous suspension to solvent. If the operation were perfectly efficient, the mole ratio would preferably be 1.0:1 moles caffeic acid to caffeine so that every mole of caffeine in the solvent would complex with all the caffeic acid, leaving the caffeine solvent and water phases free of caffeic acid and caffeine. Perfect efficiency is impossible and so, it is preferable that the mole ratio be anywhere from 1.0:1 to 2:1 caffeic acid to caffeine. It is possible to use a mole ratio higher than 2:1 but there is no particular advantage in doing so.

The volume ratio of aqueous suspension to caffeine solvent is also related to efficiency. It is desirable to minimize the volume ratio so as to minimize the volumes handled but at the same time, the volume ratio must be sufficiently large to permit effective contact. Although any volume ratio upwards of 0.5:1 aqueous suspension to caffeine solvent is useful, the most preferred volume ratio is between 1.0:1 and 2.0:1 aqueous suspension to caffeine solvent.

Contact of the aqueous caffeic acid suspension and caffeine solvent may be by any manner providing good liquid-liquid contact but is most preferably batch. The concentrated caffeine solvent is placed in the batch tank and the aqueous suspension is then added thereto. If the aqueous suspension is more dense than the caffeine solvent, the suspension will settle to the bottom of the tank and the insoluble complex crystals will settle to the bottom of the aqueous layer. If the aqueous suspension is less dense than the caffeine solvent, the aqueous suspension will remain on top and the complex crystals will tend to settle at the interface of the aqueous suspension and caffeine solvent. The tank contents are maintained under moderate agitation until equilibrium is reached, typically in under one hour at ambient temperature.

When the aqueous caffeic acid suspension and caffeine solvent have been contacted for a sufficient period of time, the caffeic acid/caffeine complex crystals are removed and the two liquids are separated. The preferred method of removing the complex crystals is by filtration, although any of the known solid-liquid separation techniques are generally acceptable. In the case of batch contact, the contents of the batch tank are simply drained and passed through a filter. The complex crystals recovered in the filter may be processed further to recover the caffeic acid and caffeine. It is preferable to rinse the crystals in a small portion of fresh caffeine solvent so as to remove adhering non-caffeine solubles. The solvent rinse may be held for subsequent combination with the decaffeinated caffeine solvent. The complex crystals may then be refluxed in fresh caffeine solvent which has the effect of slowly breaking the complex so that caffeine dissolves in the solvent and solid caffeic acid remains behind. This may be carried out at the boiling point of the caffeine solvent or at ambient temperature under a reduced pressure. The caffeine is then easily crystallized from the caffeine solvent by techniques well known in the art.

The aqueous suspension and decaffeinated caffeine solvent from which the complex crystals have been removed are then separated into a solvent and water phase. The phases will separate of themselves on standing but the process is relatively slow and inefficient. Preferably, the liquids are passed through a centrifuge designed to separate a denser liquid from a less dense liquid, such as are well known in the art. After separation, the water phase contains a small portion of non-caffeine solubles. The caffeine solvent contains some non-caffeine solubles and perhaps some caffeine, depending on the degree of decaffeination achieved in the contact with the aqueous caffeic acid suspension.

Inasmuch as the maximum degree of decaffeination in a single batch stage (without concurrent evaporation of the caffeine solvent) has been found to be about 93% by weight of the caffeine initially present, it may be preferable to re-contact the caffeine solvent with a second aqueous suspension so that in excess of 97% by weight decaffeination is achieved. The procedure for the re-contact is the same as for the initial contact. The caffeine solvent is further evaporated so that the caffeine concentration is preferably 4% by weight or greater. An aqueous caffeic acid suspension is prepared, preferably using the water recovered after the initial contact. The remainder of the processing is as hereinabove set forth. By contacting the caffeine solvent in a second batch stage, decaffeination in excess of the commercially desirable 97% by weight is possible.

Alternatively, it is possible to reach or exceed 97% by weight decaffeination in a single stage if there is also concurrent evaporation of some of the caffeine solvent. As hereinabove described, the degree of decaffeination is related to caffeine concentration in the caffeine solvent. If there is some concurrent evaporation of the caffeine solvent duuring the batch contact, the caffeine concentration is maintained sufficiently high to obtain the desired degree of decaffeination. Typically, anywhere from about 50% to 75% of the initial volume of the caffeine solvent is concurrently evaporated. Such evaporation is easily carried out by maintaining the contents of the batch tank at or near the boiling point of the caffeine solvent, which boiling point is typically much lower than that of water. The evolving caffeine solvent vapor is conveniently condensed and recycled.

After one or two contacts with the aqueous caffeic acid suspension, the decaffeinated caffeine solvent containing a portion of non-caffeine solubles is added to the decaffeinated coffee extract so as to recover important body notes. The caffeine solvent has been considerably reduced in volume by the previous evaporation needed to reach the desired initial caffeine concentration in the solvent. The reduced volume of caffeine solvent makes it easier to combine the generally immiscible solvent in the extract so as to transfer the body notes back to the extract. Combining the solvent with the extract is also made easier by the fact that, depending on the particular caffeine solvent, a small amount of solvent will actually be soluble in the extract. After sufficient mixing, the caffeine solvent is stripped from the extract and retained for recycling. Such stripping may be carried out by passing steam through the extract and other known solvent stripping techniques. It has been found that the non-caffeine solubles, particularly those solubles contributing the body notes, are not stripped along with the caffeine solvent.

The water used in the aqueous caffeic acid suspension also has a small portion of non-caffeine solubles transferred to it upon contact with the caffeine solvent. While it is not as important to recover these non-caffeine solubles, their return to the decaffeinated coffee extract does contribute to an improved soluble coffee. After removal of the complex crystals and separation from the decaffeinated caffeine solvent then, the water used in the aqueous caffeic acid suspension can be added to the decaffeinated coffee extract. As the concentration of non-caffeine solubles in the water is typically quite low, it is preferable to evaporate some and even most of the water prior to the addition to the decaffeinated coffee extract. If the water is not evaporated prior to the combination with the coffee extract, then the extract can simply be concentrated prior to drying the extract into a soluble coffee. Alternatively, the water may be recycled to the method to make up a fresh aqueous caffeic acid suspension. Under such a scheme, the water eventually becomes saturated with non-caffeine solubles and will not then absorb additional non-caffeine solubles upon contact with caffeine-containing caffeine solvent.

The decaffeinated coffee extract that has had the decaffeinated caffeine solvent mixed therewith and stripped therefrom and to which the non-caffeine solubles-containing water has or has not optionally been added may be dried into a soluble coffee. It is preferable to enrich the flavor and aroma of the decaffeinated extract with some of the more volatile flavor and aroma compounds prior to drying the extract. This is particularly true for those embodiments wherein the volatile flavor and aroma compounds are stripped from the coffee extract prior to decaffeination. As hereinabove described, such flavor and aroma compounds are generally recovered as liquid condensates. Such condensates are then added to the decaffeinated roasted coffee shortly before drying the same. Drying of the decaffeinated extract is carried out by known techniques, preferably spray drying or freeze drying. The soluble coffees so produced are characterized as having more body notes than decaffeinated soluble coffees produced by known methods.

The following example is intended to illustrate certain embodiments of the present invention. The example is not meant to limit the invention beyond what is claimed below.

EXAMPLE

1. A roasted coffee extract, containing about 15% by weight total solids and 0.6% by weight caffeine, was obtained from a countercurrent multi-stage extraction battery having 6 stages and a feedwater temperature of about 180° C.

2. The roasted coffee extract was concentrated in a Centritherm evaporator to a concentration of about 55% by weight solids to strip the aroma and flavor therefrom.

3. The stripped roasted coffee extract was then diluted to a concentration of about 25% by weight total solids and about 1% by weight caffeine.

4. The roasted coffee extract was contacted with methylene chloride in a Karr column at ambient temperature. The weight ratio was 4.5:1 methylene chloride to roasted coffee extract. The degree of decaffeination was in excess of 97% by weight of the caffeine initially present. The methylene chloride withdrawn from the Karr column contained about 0.25% by weight total solubles. The caffeine concentration was 0.17% by weight with the remainder of the 0.25% being non-caffeine solubles.

5. The methylene chloride was concentrated in a still to 10.5% by weight total solids and 7.0% by weight caffeine.

6. A 250 cc sample of the methylene chloride was contacted in a beaker with 500 cc of an aqueous caffeic acid suspension containing 23 g of caffeic acid. Contact was at ambient temperature for about 30 minutes under moderate agitation. Crystals were seen to grow at the interface between the water and the methylene chloride.

7. The crystals were then filtered from the liquids using a coarse filter paper. The methylene chloride and water phases were allowed to separate on standing and the water was decanted off. The crystals were analyzed and found to be an equimolar complex of caffeic acid and caffeine. The methylene chloride was analyzed and it was found that about 90% by weight of the caffeine initially present had been removed.

8. The water phase recovered above was washed with two 50 cc volumes of fresh methylene chloride to recover some non-caffeine solubles. This methylene chloride washing step is a third and additional alternative for dealing with the water used in the aqueous suspension.

9. The two 50 cc volumes of methylene chloride were combined with the solvent from above and the solvent was vacuum distilled at 32° C. to 35° C. to a volume of 110 cc.

10. The concentrated 110 cc sample of methylene chloride was contacted in a beaker with 110 cc of an aqueous caffeic acid suspension containing 5 g of caffeic acid. A portion of the water from Step 8 was used to make the aqueous suspension. Contact was again at ambient temperature for about 30 minutes under moderate agitation. Crystals were again seen to grow at the interface between the water and methylene chloride.

11. The components were again separated as in Step 7. An additional 70% by weight of the caffeine present in the methylene chloride was found to have been removed. In total about 97% by weight of the caffeine initially present was removed by the two stage decaffeination.

12. The methylene chloride from Step 11 was added to the decaffeinated roasted coffee extract of Step 4. The methylene chloride was then stripped therefrom by vacuum distillation at a temperature of about 65° C. and at an absolute pressure of about 0.5 atm.

13. The water from Steps 8 and 11 was then added to the extract of Step 12 and the extract was diluted to normal cup strength, about 1% by weight total solids.

14. A control sample of roasted coffee extract which had been decaffeinated with methylene chloride under the same conditions was prepared but the methylene chloride was not then decaffeinated nor added back. The control sample was also diluted to about 1% by weight total solids.

15. The extract from Step 13 and the control samples were tasted by an expert panel. The extract of Step 13 was judged to have more body notes than the noticably thinner control sample.

What is claimed is:

1. A roasted coffee extract decaffeination method providing a soluble coffee of improved flavor which comprises:
   (a) contacting an aqueous roasted coffee extract with a halogenated hydrocarbon caffeine solvent so that caffeine and a lesser amount of non-caffeine solubles are transferred from the roasted coffee extract to the caffeine solvent;
   (b) separating the substantially decaffeinated roasted coffee extract and the caffeine-containing solvent;
   (c) concentrating the caffeine solvent;
   (d) contacting the concentrated solvent with an aqueous suspension of caffeic acid which suspension contains at least an equimolar amount of caffeic acid as caffeine in the solvent;

(e) filtering caffeic acid/caffeine complex crystals after they have grown in the water phase;

(f) separating the water phase from the caffeine solvent;

(g) adding the caffeine solvent which still contains non-caffeine solubles to the substantially decaffeinated roasted coffee extract of (b);

(h) stripping the caffeine solvent from the roasted coffee extract; and (i) drying the coffee extract to provide a soluble coffee of improved flavor.

2. A method as in claim 1 wherein the caffeine concentration is at least about 4% by weight after concentrating in step (c).

3. A method as in claim 1 wherein the caffeine solvent is methylene chloride.

4. A method in claim 1 wherein the roasted coffee extract is contacted with the caffeine solvent at a volume ratio between 3:1 and 10:1 solvent to extract.

5. A method as in claim 4 wherein the roasted coffee extract contains between 10% and 50% by weight total solubles and up to about 5% by weight caffeine.

6. A method as in claim 1 wherein the concentrated caffeine solvent is contacted with the aqueous caffeic acid suspension at a volume ratio of about 1:1 solvent to suspension.

7. A method as in claim 1 which further comprises repeating steps (c) through (f) so that the caffeine solvent is at least 97% decaffeinated based on the concentration of caffeine initially present.

8. A method as in claim 7 wherein the water phase separated in step (f) is used for the aqueous caffeic acid suspension in the subsequent repetition of steps (c) through (f).

9. A method as in claim 1 which further comprises adding the water phase separated in step (f) to the roasted coffee extract of (i) prior to drying the extract.

10. A method as in claim 1 which further comprises stripping substantially all the flavor and aroma components from the roasted coffee extract prior to the contact with the caffeine solvent, and recovering the flavor and aroma components for subsequent addition to the decaffeinated roasted coffee extract.

11. A method as in claim 10 which further comprises adding the recovered flavor and aroma components to the coffee extract of step (i) prior to drying the extract.

* * * * *

UNITED STATES PATENT AND TRADEMARK OFFICE
Certificate

Patent No. 4,547,378                            Patented October 15, 1985

On petition requesting issuance of a certificate of correction of inventorship pursuant to 35 USC 256, it has been found that the above-identified patent, through error and without any deceptive intent, improperly sets forth the inventorship. Accordingly, it is hereby certified that the correct inventorship of this patent is Fouad Z. Saleeb, Bary L. Zeller and William W. Kaleda.

Signed and Sealed this sixth Day of May 1986.

BRADLEY R. GARRIS,
*Office of the Deputy Assistant Commissioner for Patents.*